United States Patent [19]
Yoo et al.

[11] Patent Number: 6,007,719
[45] Date of Patent: Dec. 28, 1999

[54] PROCESS FOR HIGH CONCENTRATED WASTE WATER TREATMENT USING MEMBRANE SEPARATION

[75] Inventors: Seuk Won Yoo, 261-6 Chuiam-dong, Nonsan, Choongcheungnam-do 320-800; Kyu Seung Lee, Daejon, both of Rep. of Korea

[73] Assignee: Seuk Won Yoo, Choongcheungnam-do, Rep. of Korea

[21] Appl. No.: 08/894,939

[22] PCT Filed: Feb. 17, 1996

[86] PCT No.: PCT/KR96/00024

§ 371 Date: Jan. 9, 1998

§ 102(e) Date: Jan. 9, 1998

[87] PCT Pub. No.: WO96/25368

PCT Pub. Date: Aug. 22, 1996

[30] Foreign Application Priority Data

Feb. 17, 1995 [KR] Rep. of Korea .......................... 95-3034

[51] Int. Cl.⁶ ........................................................ C02F 3/28
[52] U.S. Cl. .......................... 210/603; 210/612; 210/617; 210/631; 210/151; 210/181; 210/257.2; 71/13
[58] Field of Search ...................................... 210/603, 612, 210/617, 631, 150, 151, 181, 182, 257.2, 259; 71/12, 13

[56] References Cited

U.S. PATENT DOCUMENTS

| | | | |
|---|---|---|---|
| 2,190,598 | 2/1940 | Fischer | 210/612 |
| 3,730,883 | 5/1973 | LeFrancois | 210/612 |
| 4,293,421 | 10/1981 | Green | 210/603 |
| 4,342,650 | 8/1982 | Erickson et al. | 210/631 |
| 4,511,370 | 4/1985 | Hunziker et al. | 210/603 |
| 4,609,469 | 9/1986 | Keoteklian | 210/631 |
| 4,620,929 | 11/1986 | Hofmann | 210/617 |
| 4,632,758 | 12/1986 | Whittle | 210/603 |
| 4,765,900 | 8/1988 | Schwoyer et al. | 210/631 |
| 4,931,183 | 6/1990 | Klein et al. | 210/617 |
| 5,049,266 | 9/1991 | Götz et al. | 210/151 |
| 5,269,939 | 12/1993 | Lauren et al. | 71/13 |
| 5,630,942 | 5/1997 | Steiner | 210/612 |

*Primary Examiner*—Christopher Upton
*Attorney, Agent, or Firm*—Conley, Rose & Tayon, PC

[57] ABSTRACT

The present invention relates to a process for treatment of high concentrated waste water from animal husbandry, human excretion and other high organic waste. This process includes warming, anaerobic digestion, separation with ultra filtration (UF)/reversed osmosis (RO) membranes. The residual solution after RO separation is the raw material of liquid fertilizer for water culture and foliar spray.

34 Claims, 5 Drawing Sheets

FIG. 5

PROCESS FOR HIGH CONCENTRATED WASTE WATER TREATMENT USING MEMBRANE SEPARATION

TECHNICAL FIELD OF INVENTION

The present invention relates to a process for treatment of high concentrated waste water using membrane separation, especially. This invention can be adapted to livestock husbandry, disposal of human excretion, and other high organic waste water.

BACKGROUND OF INVENTION

This process is performed by warming, anaerobic digestion(fermentation), ultrafiltration, and finally reversed osmotic separation steps also, the concentrated solution rejected by RO separation being possibly used as liquid fertilizer.

Generally, many known methods for waste water treatment have some problems in economical and technical point of view, so few of them have been used in industrial fields. Although the self-purification limit is known to be 10 mg/l of BOD, the effluents from domestic waste water range from tens to thousands mg/l of BOD and tens to ten thousands in animal waste water.

DISCLOSURE OF INVENTION

The present invention is different from ordinary known waste water treatment systems. It can decompose high concentrated organic water by anaerobic fermentation within several days, the effluents of anaerobic fermentation are treated with UF/RO membrane at the level of 0.1 mg/l of BOD.

In the warming stage, ammonia which could inhibit anaerobic fermentation is removed, and fatty acid is decomposed. Also the temperature of waste water maintains from 33° C. to 35° C., that is suitable for the following anaerobic fermentation steps.

The effluent from anaerobic tank is changed into nearly clean water through UF/RO membrane separation. And the methane gas produced from anaerobic fermentation as a by-product is possible to be used as energy source. Also, the residual solution after RO separation is aseptic and rich in organic and inorganic components, so it can become raw material of liquid fertilizer by adding some additives.

Some steps of pretreatment stage such as waste water collection, simple precipitation and solid-liquid separation are the same as in ordinary conventional process, but the core steps such as warming, adjusting step for pre-decomposition, anaerobic fermentation and UF/RO separation are necessary to purify the waste water.

Figure 5:
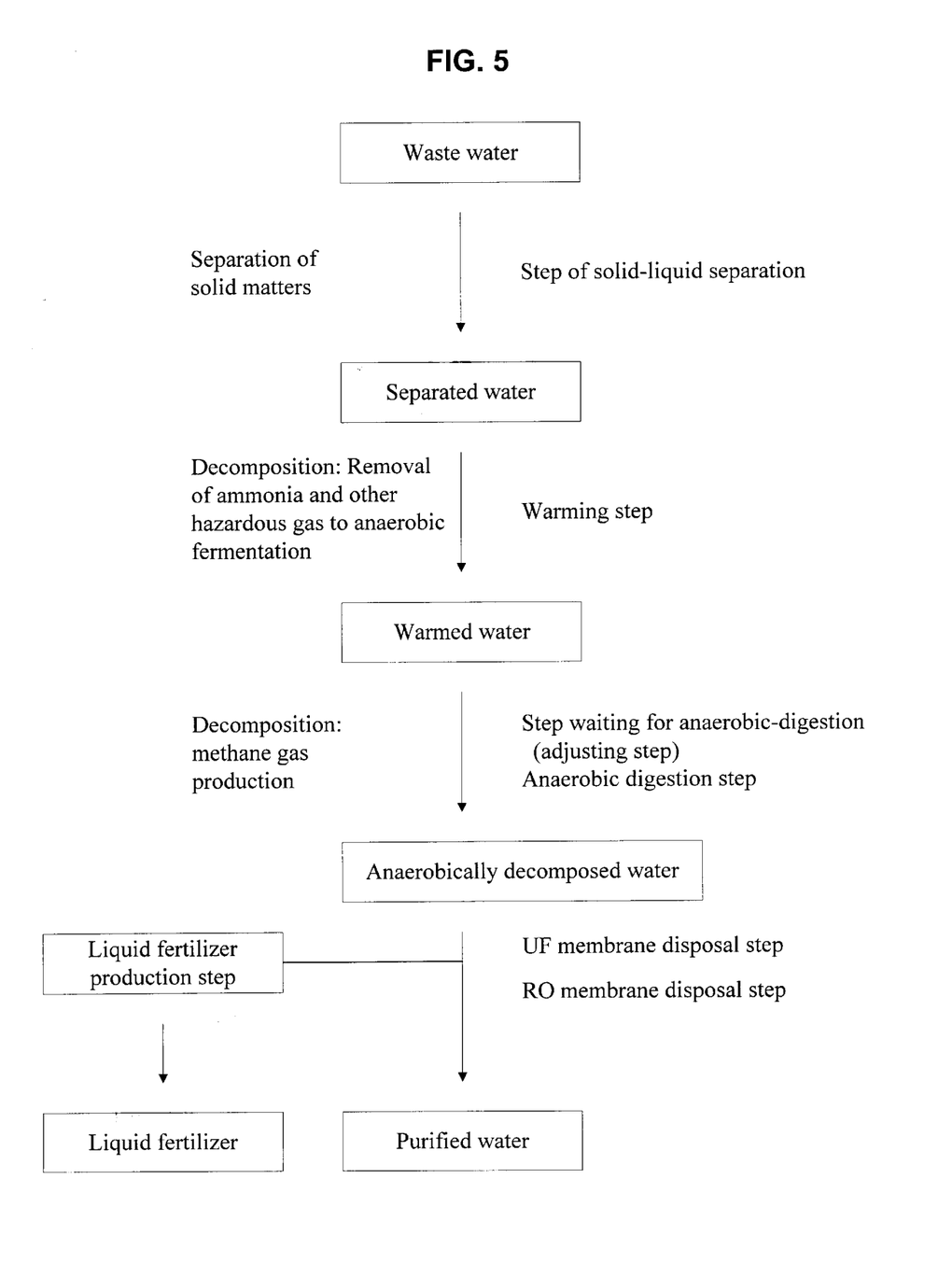
FIG. 5 depicts a flow chart of a process for producing purified water and liquid fertilizer.

These steps are diagrammed in FIG. 5.

A detailed description, referring to the drawings when necessary, of a process for treatment of high concentrated waste water is given below:

(1) Warming Step

Figure 1:
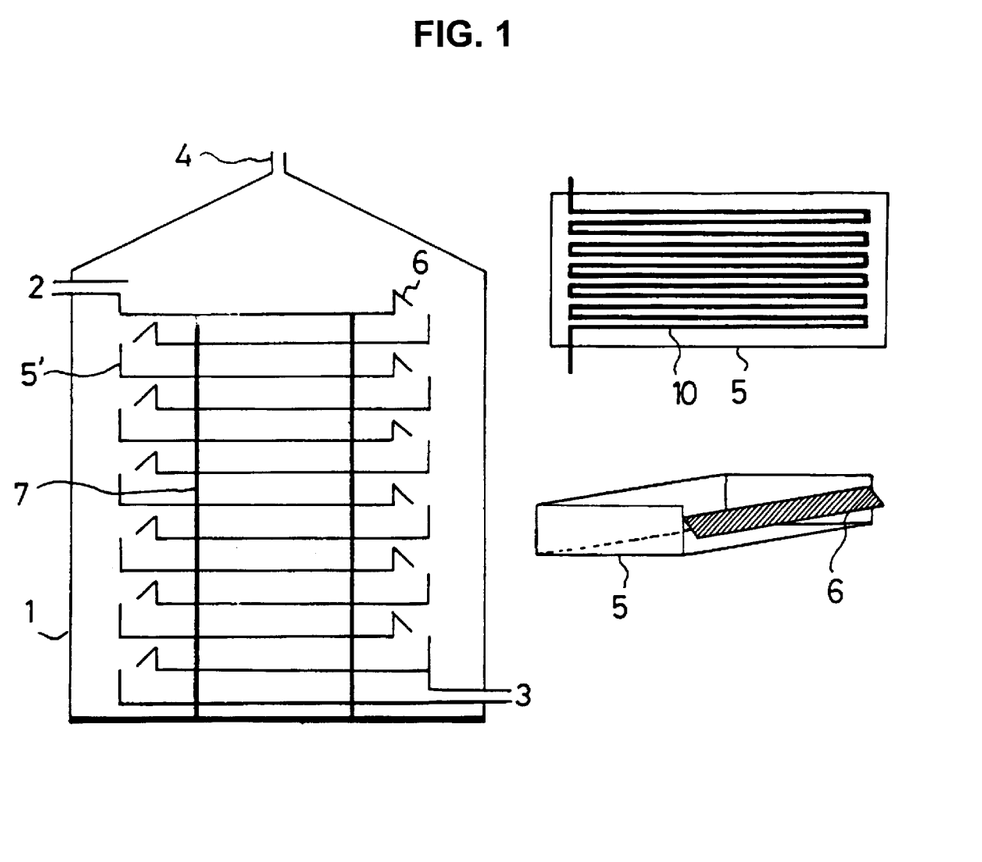
FIG. 1 is an cross-section view of the warming unit.

Of waste water, the separated water which has passed the solid-liquid separator to remove solid matters, is put into a warming unit 1 through an influent pipe 2, warmed while flowing upon warming plates 5 of stainless steel material, beneath which copper pipes 10 for flow of hot water of about 90° C. are laid, and then flows, of itself, down rugged plates 6 of ceramic material attached aslant to one side of said warming plates 5, which in turn is made in 8 to 13 stairs, gradually into an effluent pipe 3.

Figure 4:
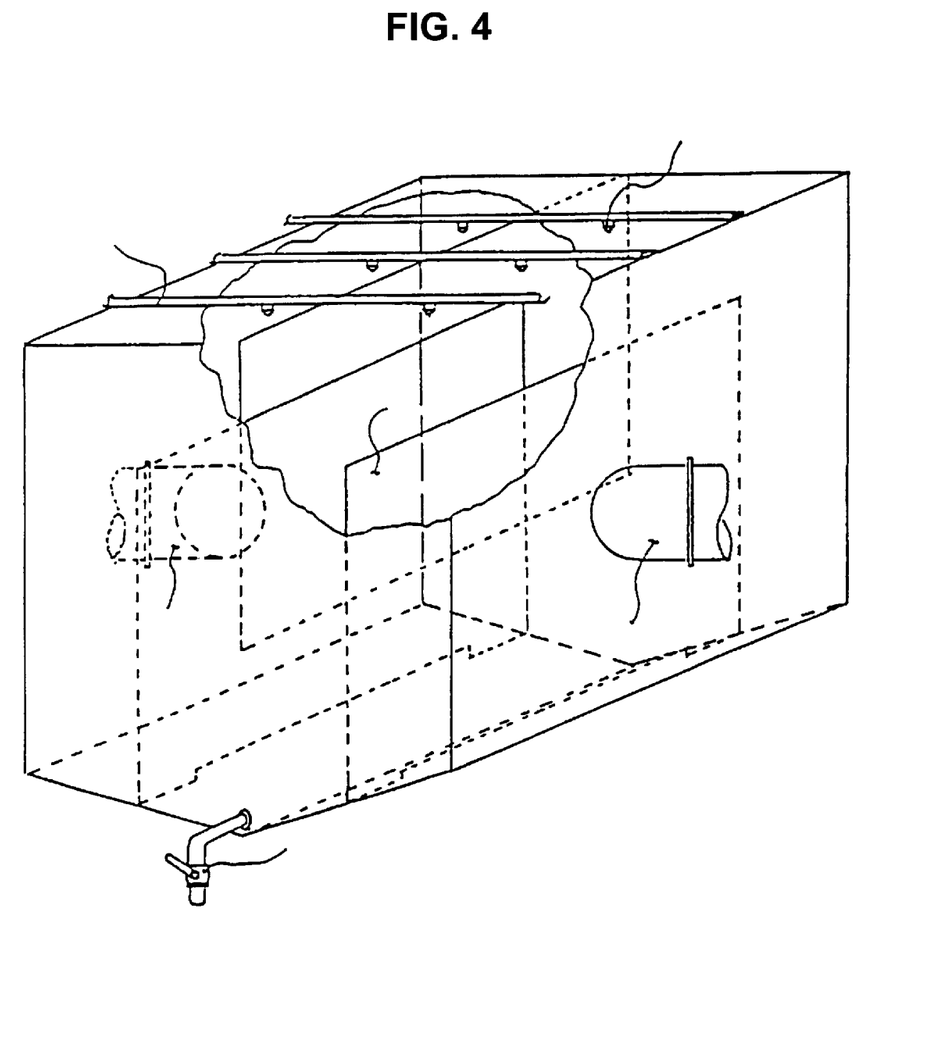
FIG. 4 is an outline of the deodorizing apparatus installed in the warming unit.

In this stage ammonia is all removed via an exhaust duct 4 in a gas collector and deodorized (with the use of the deodorization device of FIG. 4, devised by this inventor and applied for registration as a Korean utility model, Application No. 94-1158), some of the fatty acids getting decomposed in the meantime. The warmed water flowing out of said effluent pipe 3 of said warming unit 1 is kept in store in a thermally insulated adjusting reservoir 11 (of fiber-reinforced plastic (FRP) or stainless steel) of FIG. 2 to remain at 33° C. to 35° C., and is sent to an anaerobic digestion tank 22 by certain quantity each time by fixed quantity motor pumps 19,20.

Figure 2:
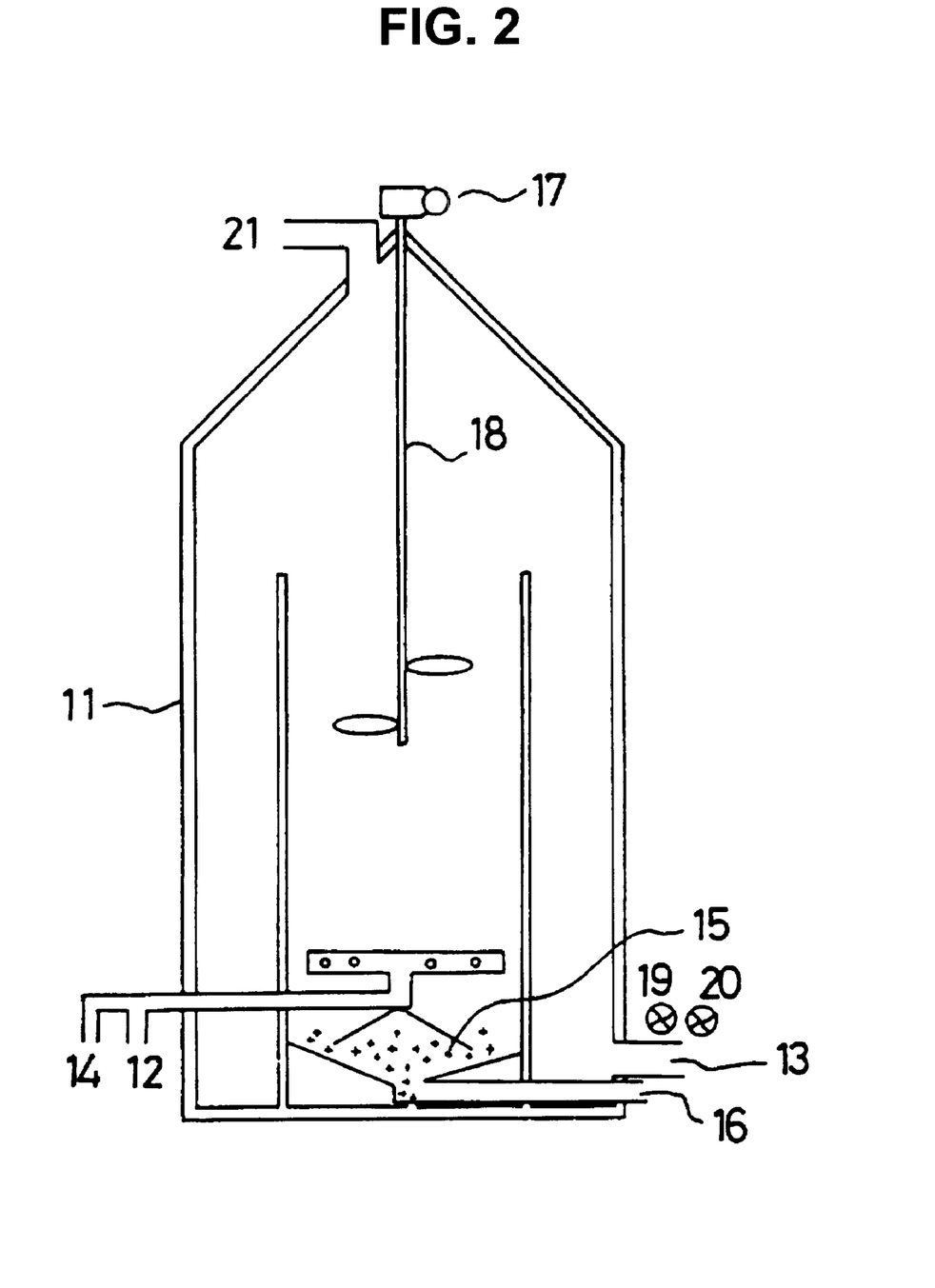
FIG. 2 is a cross-section view of the adjusting tank.
Figure 3:
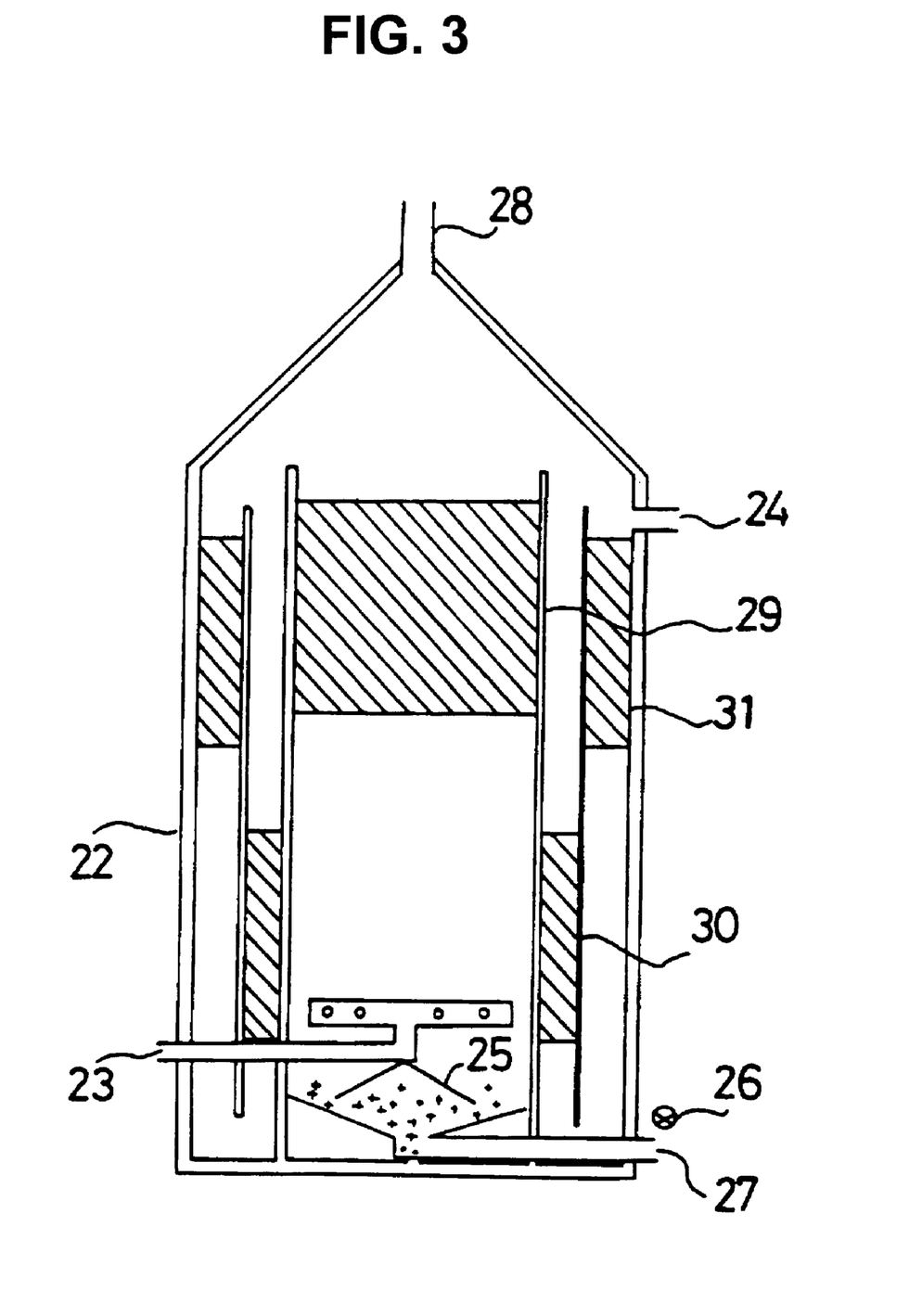
FIG. 3 is a cross-section view of the anaerobic digestion tank.

In the warming step, firstly by adoption of a multiple step of natural falling process it is made possible for a considerable quantity of the ammonia hindering anaerobic digestion to be effectively removed in a short time; secondly by means of making the warmed water flow into said anaerobic digestion tank 22 through said adjusting tank 11 kept at 33° C. to 35° C., after its passage of said effluent pipe 3 of said warming unit 1, the temperature of said warmed water at the time it flows into said anaerobic digestion tank 22 is kept at 33° C. to 35° C. in order to facilitate breeding of medium-temperature bacteria (optimum temperature: 30° C. to 35° C.). Thirdly, part of fatty acids are decomposed in advance in the warming step, and part of the remaining fatty acids removed by adsorption on the bottom of said rugged plates 5 and said rugged plates 6 so that the remnant of fatty acids can be more easily decomposed speedily and entirely in said anaerobic digestion tank 22, and by means of removing much of fatty acids which are substances lowering the permeability, of UF/RO membranes in advance in -the warming step the durability of these membranes has been extended, this achievement proving a decisive factor for adoption of a method of UF/RO membrane separation in treatment of waste water.

Said warming plates 5 in said warming unit 1 used in the warming step can each be taken apart, whereby it is made easy to remove solid matters adsorbed by them and said rugged plates 6 during the warming step of operation.

(2) Anaerobic Digestion Step

The warmed water flowing out of said effluent pipe 3 of said warming unit 1 flows in said thermally insulated adjusting tank 11, undergoes adjusting steps there, and is sent to said anaerobic digestion tank 22 by said motor pumps 19, 20. Then, the warmed water which flowed into said anaerobic digestion tank 22 through influent pipe 23 of said anaerobic digestion tank 22 passes the first contacting medium layer 29 and the second contacting medium layer 30, which both are in the central compartment of said anaerobic digestion tank 22, in an upward flow from under, and thereafter goes through the third contacting medium layer 31 to effluent pipe 24 for, at last, said UF/RO membranes separation step.

The processes of adjusting and anaerobic digestion steps are, in further detail, as follows:

Said anaerobic digestion tank 22, if desirable, can be set up in a plurality, say, two to four of them, to help in a smooth operation of the step for production of organic acid, medium steps, and the step for production of methane gas each.

In said adjusting tank 11 the ammonia gas, hydrogen sulfide, etc., which failed to volatilize in the warming step, can once more be given chance of doing so through an exhaust duct 21. By returning the granular microbes precipitated in said anaerobic digestion tank 22 to said adjusting tank 11 it is possible to prevent release of such microbes, aiding the anaerobic digestion to stabilize in a short time also.

By installing an agitator attached with a deceleration motor 17 at said adjusting tank 11 waste water is stirred at an extremely slow speed of six revolution per hour (operable according to quality of waste water of high BOD) so that microbes may not be shocked but can stay much active.

The warmed water flowing from said adjusting tank 11 into said anaerobic digestion tank 22 is kept at 33° C. to 35° C., and let to flow into said anaerobic digestion tank 22 gradually in a certain quantity each time by fixed quantity motor pumps 19, 20. To prevent methane bacteria from getting shocked at fast flow of inflowing water it is advisable to so design that the diameter of each of the influent pipes 23 is 40 mm, they arranged laterally side by side, and the hourly inflow of water for each hole of said influent pipes 23 is preferably kept at about 10 liters.

To keep granular sludge from blocking holes while precipitating it has been so designed to have open holes on both sides. By installing a plurality of fixed quantity motor pumps 19, 20, instead of a single one, it has been made possible to ease a pump of overworking for long at a time, while preparing against risk of one going out of order.

Said anaerobic digestion tank 22 is made in a circular form of FRP or stainless steel material securing great resistance strength against internal pressure, and its triple wall, thermally insulated, is made to keep a steady temperature of 33±1° C. inside even when it is −43° C. to 47° C. outside, protecting methane bacteria against shock from exterior.

Each of said contacting medium layers (of polypropylene material) is made in a height about 30% of the total height of said anaerobic digestion tank 22, the first contacting medium layer 29 being set at an area between 5/10 and 3/10 of the height of said tank, the second 30, between 2/10 and 5/10, and the third 31, between 4/10 and 7/10 of the height of said tank, all in order to maximize adsorption of methane bacteria thereon.

By so arranging that the flow of waste water inside said anaerobic digestion tank 22 is led in an upward way first passing through said first contacting medium layer 29 adsorption of microbes likely to be lost is made easier, then the flow is let to fall downstream past said second contacting medium layer 30, and finally upstream past said third contacting medium layer 31, whereby loss of microbes is prevented as much as possible and methane bacteria are kept most active.

In case four anaerobic digestion tanks, of the same design, are set up in a series the efficiency of work is raised, and the time for the anaerobic digestion is also shortened to a great deal.

The methane gas yielded as by-product of said anaerobic digestion can be collected in a collection tank (unillustrated) via an exhaust duct 28 to be turned into energy.

As has been described above, the process of anaerobic digestion in said anaerobic digestion tank is harmonized in a natural falling way, and, accordingly, adequate pH (7.2 to 7.5) for anaerobic digestion is obtained even without artificial adjustment, making it possible to complete the anaerobic digestion even in a treatment for two days when a stable flow of COD value continues after regular operation is started. COD value is kept rather steady in spite of the change of seasons and the inflow of waste water, and said anaerobic digestion is finished in five days in any case whatsoever. In view of the 30 to 35 days that ordinarily anaerobic digestion takes, this has been an amazing advancement.

The size of said anaerobic digestion tank can depend upon the quantity of waste water to be treated.

(3) Step of Membrane Separation

In order to separate the solid matters in the form of fine particle, still dispersed in the waste water that has passed through the anaerobic digestion step, UF (ultra filtration; 0.01 to 0.05 mm) is performed, and a RO (reversed osmosis; 0.002 to 0.005 mm) treatment follows. In the present invention, by this ultra filtration the colloidal particles and soluble high molecular matters are separated for use as liquid fertilizer. The ultra filtration membranes used in the step of membrane separation, are made of celluloses, polyacrylonitriles, polyolefins, or polysulfones.

In the step of said RO-membranes separation such materials of molecular weights under 350 as inorganic salts and saccharides are removed, and for these purposes membranes of cellulose acetate, aliphatic polyamides, and of their compounds are all usable.

As the method for filtration in this step of separation the cross-flow filtration has been adopted, and as the solute particles do not accumulate on the membranes during the course more than a certain thickness a continuous massive operation is possible; filtering apparatus with reverse-washing devices attached thereto have been used so that membranes may be automatically washed.

(4) Production of Liquid Fertilizer

High concentrated waste water goes through these steps of solid-liquid separation, warming, adjustment and anaerobic digestion to be decontaminated so that it is nearly perfectly purified when it finally passes said membranes for UF/RO, as has been described above, and residual solution which is aseptic and rich of such organic or inorganic matters of molecular weight from 130 to 5,000, which can pass said UF membranes but not said RO membranes, is obtained.

When this residual solution is concentrated with continuous multi-RO separation, then concentrated liquid fertilizer containing nitrogenous materials by some 2%, worthy as such, is obtained. Moreover, this liquid fertilizer, rendered almost sterile by removal already of most bacteria and yeast through passage of UF membranes, is good also for use in fertilizing on leaves. To prevent possible contamination by growth of microbes during the use of said liquid fertilizer, concentrated mugwort extract (the chlorgenic acid it contains is effective in restraining growth of microbes) by 0.05 wt %, or chitosan granules by 0.1 wt % of the liquid fertilizer, is added for use in mixture. Mugwort, in especial, is helpful in removal of the slight still remaining smell of excrement, too.

For concentrated mugwort extract what is extracted and concentrated by the use of methanol as solvent can be used.

The liquid fertilizer can be used as nutritional solution for water culture and foliar spray.

BEST MODE FOR PRACTICE OF THE INVENTION

(1) Warming Step

High concentrated waste water collected from a stock farm and human excrement taken from a human excrement disposal facility were mixed in a ratio of 5 to 5, and the resultant waste water, 10 metric tons of it, was passed through the step of solid-liquid separation, the thus separated waste water was treated by the warming step following the process described above in the warming unit (as shown in FIG. 1) equipped with 13 warming plates. Part of the warmed waste water flowing through the effluent pipe of the warming unit was taken and the effect of removal of contamination material by the warming treatment was analyzed to obtain the results, given in Table 1 below:

TABLE 1

Effects of removal of various contaminating matters during step of warming

| | | | Items (ppm) | | | |
|---|---|---|---|---|---|---|
| Div. | BOD | COD | N-hexane extracts | $NH_4$—N | $PO_4$—P | SS |
| Original | 8600 | 1500 | 140 | 500 | 120 | 2800 |
| Warmed | 6880(20) | 1425(5) | 110(21) | 350(30) | 117(3) | 860(69) |

( ) removal rate %

(2) Step of Anaerobic Digestion

The warmed water which had undergone the warming treatment and outflowed through the effluent pipe of the warming unit was drawn to, and stored in, the adjusting tank (as shown in FIG. 2); it was sent by the fixed quantity motor pumps of the adjusting tank to flow into the anaerobic digestion tank (as shown in FIG. 3) by 0.5 ton per hour, and then was given anaerobic digestion treatment for five days according to the above-described step of anaerobic digestion. For the contacting medium layers inside the anaerobic digestion tank Sam Hwan Rasch Ring (product name) was made use of. Now part of the waste water flowing out of the anaerobic digestion tank through the outflowing pump after having gotten the anaerobic digestion treatment was taken and analyzed to determine the decontamination effects of the combination of the warming and anaerobic digestion steps, the results obtained being given in Table 2 below.

To determine the effects of the anaerobic digestion step by itself, some waste water which had not undergone a warming treatment step was taken and given this anaerobic digestion treatment. The results of analysis of this portion are also included in Table 2.

TABLE 2

Effects of decontamination by anaerobic digestion

| | | | Items (ppm) | | | |
|---|---|---|---|---|---|---|
| Div. | BOD | COD | N-hexane extracts | $NH_4$—N | $PO_4$—P | SS |
| Orig. | 8600 | 1500 | 140 | 500 | 120 | 2800 |
| UAD | 1608(81.3) | 250(83.3) | 21(85) | 100(80) | 48(60) | 65(98) |
| W + UAD | 1286(85) 17(99.4) | | 238(84.2) | 17(87.9) | 70(86) | 46.8(61.0) |

( ) removal rate %
Orig.: untreated waste water
UAD: anaerobically digested
W + UAD: warmed and anaerobically digested

(3) Membrane Separation Step

Analysis was made of the decontaminating effects of each type of membranes obtained by operation under the conditions given in Table 3 as well as of the duration of each type of membranes, the results being given in Tables 4 and 5 below.

TABLE 3

Types of membranes and operation conditions

| | UF | RO |
|---|---|---|
| Temperature | 19.9~21.1 | 21.5 |
| Flows ($m^3$/hr) | 1.0~1.2 | 0.95~1.1 |
| Pressure (kg/$cm^2$) | 6.0~8.8 | 25~26 |
| Concentration rate | 4.7 | 7.2 |
| Average flux (L/$m^2$ · hr. 25° C.) | 31.9 | 21.9 |

TABLE 4

| | | UF | | | RO | |
|---|---|---|---|---|---|---|
| | Orig. | A | B | C | D | E |
| BOD | 8600 | 1500(93.5) | 230(97.3) | 1930(77.6) | below 0.1 | 70 |
| COD | 1500 | 1200(20.2) | 350(96.7) | 1430(4.7) | 2.7 | 140 |
| SS | 2800 | 950(66.1) | 0(100.0) | 2300(17.8) | -- | -- |
| $NH_4$—N | 500 | 500(0.0) | 460(8.0) | 500(0.0) | 20 | 35 |
| $PO_4$—P | 120 | 68(43.3) | 55(54.2) | 84(30.0) | 0.16 | 5.4 |

TABLE 4-continued

|  | Orig. | UF | | | RO | |
|---|---|---|---|---|---|---|
|  |  | A | B | C | D | E |
| N-hexane extracts | 140 | --(100.0) | --(100.0) | 23(83.6) | -- | -- |
| Chromaticity |  | ++ | ++ | ++ | traces of ammonia | + |
| Smells |  | ++ of hog's dung | ++ | ++ |  | of hog's dung |

( ) removal rate %
The waste water at the time of RO membrane treatment is the one outflowed from the UF membrane B.
A: polysulfone
B: polyacrylonitrile
C: cellulose
D: polyamide
E: cellulose acetate
+: clarity
--: not detected

TABLE 5

Average duration of membranes of different materials

| UF | | RO | |
|---|---|---|---|
| materials | duration (months) | materials | duration (months) |
| polysulfone | 8 | polyamide | over 16 plus |
| polyacrylonitrile | 10 | cellulose acetate | 10 |
| cellulose | 7 |  |  |

On the basis of these experimentation results, the waste water which had undergone the anaerobic digestion treatment was again given a UF (using UF(B) membrane of Table 4) and a RO (with the use of RO(D) membrane of Table 4) treatments, to determine the decontamination effects, the step-by-step results being given in summary in Table 6 below.

(4) Step of Liquid Fertilizer Production

The residual solution which, in the step of separation by membranes, passed the UF membrane but failed to pass the RO membranes was collected and concentrated with continuous multi-RO separation, whereby water was partly removed and 1.8 tons of concentrated liquid fertilizer was obtained; to which was added concentrated extract of mugwort in the amount to constitute 0.05 wt %, then the mixture was diluted with water to 300 to 800 times to obtain adequate liquid fertilizer.

This liquid fertilizer was tested in horticulture, when foliar-sprayed vegetables and flowers on their leaves to find it was effective in promotion of growth, bringing forth an improvement of their quality in general, especially in rich color, as shown in Table 7.

TABLE 6

Step by step decontamination effects

| Treatment | Items (ppm) | | | | | |
|---|---|---|---|---|---|---|
|  | BOD | COD | SS | $NH_4$—N | $PO_4$—P | N-hexane extracts |
| Orig. | 8600 | 1500 | 2800 | 500 | 120 | 140 |
| Post-warming | 117(3.0) | 6880(20.0) 110(21.0) | 1425(5.0) | 860(69.0) |  | 350(30.0) |
| W + UAD | 1286(85.0) | 238(84.2) | 17(99.4) | 70(86.0) | 46.8(61.0) | 17(87.9) |
| After passage of UF(B) | 34.7(99.6) | 55.5(96.3) | --(100.0) | 64.4(87.2) | 21.4(82.1) | --(100.0) |
| (W + UAD + UF) + passage of RO(D) | below 0.1 (over 99.9) | below 1.2 (over 99.02) | --(100.0) | 2.8(99.5) | below 0.1 | --(100.0) (over 99.9) |

--: Not detected
( ): decontamination %

TABLE 7

Effects of liquid fertilizer when foliar-sprayed

| Plants | No admin. | liquid comp. admin. | Remarks |
|---|---|---|---|
| Water melon (sweetness) | 10°–11° | 14°–15° | |
| Raddish (weight) | 42 g | 51 g | in 20 days |
| Red pepper (number of fruit/week) | 42–42 | 48–52 | |
| Carnation (color) | ++ | +++ | color clarity |
| Lily (freshness) | ++ | +++ | about a week |

We claim:

1. A process for treatment of a waste water stream, the waste water stream comprising a mixture of solid material suspended in a liquid, comprising:
   removing a portion of the solid material from the waste water stream to produce a separated waste stream;
   passing the separated waste stream through a warming unit to warm at least a portion of the waste stream, wherein the warming unit comprises a plurality of warming plates and overflow plates, at least one of the overflow plates coupled to an end of at least one of the warming plates;
   passing the warmed waste stream through an anaerobic digestion tank to produce a waste stream that has been at least partially anaerobically digested; and
   passing the at least partially anaerobically digested waste stream through a filtration member, wherein the filtration member separates the waste stream into an at least partially purified water stream and a residual solution.

2. The process according to claim 1, wherein the anaerobic digestion tank comprises a first contacting medium layer, a second contacting medium layer and a third contacting medium layer, and wherein passing the warmed separated waste stream through the anaerobic digestion tank comprises passing the warmed separated waste stream through the first, second and third contacting medium layers.

3. The process according to claim 1, further comprising storing the warmed separated waste stream in an adjustment tank prior to passing the warmed separated waste stream through an anaerobic digestion tank.

4. The process according to claim 1, further comprising passing the residual solution through multiple reversed osmosis separation membranes to obtain a liquid fertilizer.

5. The process according to claim 5, further comprising adding chlorgenic acid to the liquid fertilizer.

6. The process according to claim 4, further comprising adding chitosan to the liquid fertilizer.

7. The process of claim 4, further comprising adding an antimicrobial agent to the liquid fertilizer.

8. The process of claim 1, further comprising removing ammonia from the separated waste stream while the separated waste stream is passed through the warming unit.

9. The process of claim 1, further comprising removing fatty acids from the separated waste water stream while the waste water stream is passed through the warming unit.

10. The process of claim 1, wherein the warmed waste stream is kept in the anaerobic digestion tank for a time period ranging from about 2 days to about 5 days.

11. The process of claim 1, wherein passing the at least partially anaerobically digested waste stream through a filtration member comprises passing the at least partially anaerobically digested waste stream through an ultra filtration membrane.

12. The process of claim 11, wherein the ultra filtration membrane comprises a pore size ranging from about 0.01 mm to about 0.05 mm.

13. The process of claim 11, wherein the ultra filtration membrane is formed from a material comprising cellulose, polyacrylonitrile, polyolefin, or polysulfone.

14. The process of claim 1, wherein passing the at least partially anaerobically digested waste stream through a filtration member comprises passing the at least partially anaerobically digested waste stream through a reverse osmosis membrane.

15. The process of claim 14, wherein the reverse osmosis membrane comprises a pore size ranging from about 0.002 mm to about 0.005 mm.

16. The process of claim 14, wherein the reverse osmosis membrane is formed from a material comprising cellulose acetate or aliphatic polyamides.

17. The process of claim 1, wherein passing the at least partially anaerobically digested waste stream through a filtration member comprises passing the at least partially anaerobically digested waste stream through an ultra filtration membrane and a reverse osmosis membrane.

18. The process of claim 17, wherein the ultra filtration membrane is formed from a material comprising polyacrylonitrile, and wherein the reverse osmosis membrane is formed from a material comprising polyamide.

19. A process for making a liquid fertilizer from a waste water stream, the waste water stream comprising a mixture of solid material suspended in a liquid, comprising:
   removing a portion of the solid material from the waste water stream to produce a separated waste stream;
   passing the separated waste stream through a warming unit, wherein the warming unit comprises a plurality of warming plates and overflow plates, each of the overflow plates coupled to an end of each of the warming plates, to warm at least a portion of the waste stream waste stream;
   passing the warmed waste stream through an anaerobic digestion tank to produce an at least partially anaerobically digested waste stream;
   passing the at least partially anaerobically digested waste stream through a filtration member to produce a residual solution; and
   adding an antimicrobial agent to the residual solution to produce the liquid fertilizer.

20. The process of claim 19, wherein the antimicrobial agent comprises chlorgenic acid.

21. The process of claim 19, wherein the antimicrobial agent comprises mugwort.

22. The process of claim 19, wherein the antimicrobial agent comprises chitosan.

23. The process of claim 19, wherein passing the at least partially anaerobically digested waste stream through a filtration member comprises passing the at least partially anaerobically digested waste stream through an ultra filtration membrane and a reverse osmosis membrane, wherein passage through the ultra filtration membrane and the reverse osmosis membrane produces an at least partially purified water stream and the residual solution.

24. The process of claim 23, further comprising treating the residual solution to multiple reverse osmosis filtrations prior to adding the antimicrobial agent to the residual solution.

25. A system for purifying a waste water stream, the waste water stream comprising a mixture of solid material suspended in a liquid, comprising:
   a solid-liquid separation apparatus, the solid-liquid separation apparatus being configured to remove a portion of the solid material from the waste water stream;

a warming unit coupled to the solid-liquid separation apparatus, the warming unit comprising a plurality of warming plates and overflow plates, each of the overflow plates coupled to an end of each of the warming plates, wherein the warming unit is configured to warm at least a portion of the waste stream;

an anaerobic digestion tank coupled to the warming unit, the anaerobic digestion tank being configured to anaerobically digest at least a portion of waste material in the waste water stream to produce an at least partially anaerobically digested waste water stream; and a filtration member system coupled to the anaerobic digestion tank, the filtration member system being configured to separate the waste stream into a substantially purified water stream and a residual solution.

26. The system of claim 25, wherein the anaerobic digestion tank comprises a first contacting medium layer, a second contacting medium layer and a third contacting medium layer, wherein the digestion tank is configured such that the waste water stream is passed through the first, second and third contacting medium layers.

27. The system of claim 25, further comprising an adjustment tank coupled to the warming unit and the anaerobic digestion tank, wherein the adjustment tank is configured to transfer the waste water stream to the anaerobic digestion tank.

28. The system of claim 25, wherein the adjustment tank further comprises a motor pump for transferring the waste water stream to the anaerobic digestion tank at a substantially constant rate.

29. The system of claim 25, wherein the adjustment tank is configured to maintain an effluent stream flowing from the adjustment tank toward the anaerobic digestion tank at a temperature ranging from about 33° C. to about 35° C.

30. The system of claim 25, wherein the filtration membrane system comprises an ultra filtration membrane and a reverse osmosis membrane.

31. The system of claim 30, wherein the ultra filtration membrane comprises a pore size ranging from about 0.01 mm to about 0.05 mm.

32. The system of claim 30, wherein the ultra filtration membrane is formed from a material comprising cellulose, polyacrylonitrile, polyolefin, or polysulfone.

33. The system of claim 30, wherein the reverse osmosis membrane comprises a pore size ranging from about 0.002 mm to about 0.005 mm.

34. The system of claim 30, wherein the reverse osmosis membrane is formed from a material comprising cellulose acetate or aliphatic polyamides.

* * * * *